(12) United States Patent
Murade

(10) Patent No.: US 7,116,390 B2
(45) Date of Patent: Oct. 3, 2006

(54) ELECTRO-OPTICAL DEVICE AND ELECTRONIC APPARATUS COMPRISING THE SAME

(75) Inventor: Masao Murade, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 113 days.

(21) Appl. No.: 10/852,255

(22) Filed: May 25, 2004

(65) Prior Publication Data

US 2005/0162605 A1   Jul. 28, 2005

(30) Foreign Application Priority Data

Jun. 2, 2003 (JP) .............................. 2003-156832
Mar. 19, 2004 (JP) .............................. 2004-081532

(51) Int. Cl.
*G02F 1/1345* (2006.01)
(52) U.S. Cl. ...................... 349/149; 349/150; 349/151; 349/152; 345/87
(58) Field of Classification Search ................ 349/149, 349/150, 151, 152; 345/87
See application file for complete search history.

(56) References Cited

U.S. PATENT DOCUMENTS 6,011,607 A * 1/2000 Yamazaki et al. .......... 349/153
6,531,996 B1 * 3/2003 Murade ...................... 345/98
6,979,839 B1   12/2005 Murade
2002/0171638 A1   11/2002 Ishiyama

FOREIGN PATENT DOCUMENTS

| JP | A 10-253984 | 9/1998 |
|---|---|---|
| JP | A 11-202367 | 7/1999 |
| JP | A 11-223832 | 8/1999 |
| JP | A 2000-137205 | 5/2000 |
| JP | A 2000-162634 | 6/2000 |
| JP | 2002049052 A * | 2/2002 |
| JP | A 2002-49052 | 5/2002 |
| KR | A 2001-0105272 | 11/2001 |
| KR | A 2002-0082425 | 10/2002 |

\* cited by examiner

*Primary Examiner*—David Nelms
*Assistant Examiner*—(Nancy) Thanh-Nhan P Nguyen
(74) *Attorney, Agent, or Firm*—Oliff & Berridge, PLC

(57) ABSTRACT

The invention provides an electro-optical device that can include, in a peripheral region of the image display region on the element substrate, a plurality of external circuit connection terminals, a plurality of main wiring lines each having one end connected to each of the plurality of external circuit connection terminals, and peripheral driving circuits connected to the other ends of the main wiring lines, the peripheral driving circuits for driving the pixel portions based on electric signals supplied from the external circuit connection terminals through the main wiring lines. The plurality of main wiring lines can be made of the same conductive film and are planarly laid out so as not to intersect each other in the peripheral region.

13 Claims, 10 Drawing Sheets

ELECTRO-OPTICAL DEVICE AND ELECTRONIC APPARATUS COMPRISING THE SAME

BACKGROUND OF THE INVENTION

1. Field of Invention

The present invention relates to an electro-optical device, such as a driving circuit built-in liquid crystal device, obtained by mounting peripheral driving circuits on an element substrate and an electronic apparatus including the electro-optical device.

2. Description of Related Art

In an electro-optical device, such as a liquid crystal device, a plurality of pixel portions driven for displaying images are arranged in a matrix in an image display region. Pixel electrodes and thin film transistors (TFT) for switch controlling the pixel electrodes are arranged within the pixel portions and wiring lines, such as scanning lines, data lines, and capacitance lines are provided along the gaps among the pixel electrodes adjacent to each other in vertical and horizontal directions in each pixel portion. In particular, in the case of the driving circuit built-in liquid crystal device, scanning line driving circuits and a data line driving circuit for driving the scanning lines and the data lines are mounted in a peripheral region on the same element substrate. Therefore, in general, various wiring lines, such as power source signal lines, clock signal lines, image signal lines, and control signal lines are planarly laid out in the peripheral region, which connect a plurality of external circuit connection terminals arranged along one side of the element substrate to the peripheral driving circuits.

Here, as it is desirable to miniaturize the electro-optical device or the element substrate, a technology of laying out various wiring lines planarly is provided so that various wiring lines connecting the external circuit connection terminals to the peripheral circuits are provided in the restricted peripheral region in such a way that mutual noise among the various wiring lines arranged to be close to each other is reduced. According to such an electro-optical device, it can be possible to realize high quality images by improving a driving frequency or a degree of precision while miniaturizing the device or the element substrate.

SUMMARY OF THE INVENTION

However, according to the conventional technology of providing various wiring lines in the peripheral region, a plurality of wiring lines (main wiring lines) each having one end connected to each of the plurality of external circuit connection terminals exist in the restricted peripheral region. Furthermore, the number of main wiring lines or the number of external circuit connection terminals tends to increase as the driving method becomes complicated. Therefore, at least several main wiring lines must have the other ends intersected to other main wiring lines in order to be routed to the peripheral driving circuits or upper and lower conduction terminals. In each of the intersections, a laminated structure established on the element substrate must be provided which forms a relay wiring line portion made of another conductive film laminated on or under the conductive film that constitutes at least one main wiring line. Considering that the main wiring lines are made of the conductive film having the lowest resistance among the laminated structures established on the element substrate, such as aluminum, that the relay wiring line portions are made of another conductive film, that is, a conductive film whose resistance is not the lowest causes a technical problem in that resistance remarkably increases in the main wiring lines. Increase in the resistance in the main wiring lines easily deteriorates picture quality due to the uses of the main wiring lines.

It is very difficult to improve picture quality by reducing a pixel pitch or a wiring line pitch while miniaturizing the device by reducing the size of the peripheral region. Furthermore, when the above-mentioned relay wiring lines are provided, resistance caused by contact resistance or contact hole resistance increases and the laminated structures on the element substrate become complicated, as well as the manufacturing processes involved, which negatively impact the reliability of the device and the production yield, respectively.

Accordingly, it is an object of the invention to provide an electro-optical device capable of effectively reducing the resistance of main wiring lines and of preventing mutual interference among signals of the main wiring lines thus allowing high quality display images, and to provide an electronic apparatus comprising the electro-optical device.

The invention can provide an electro-optical device, having a plurality of pixel portions provided in an image display region on an element substrate. The device can also include in a peripheral region of the image display region on the element substrate, a plurality of external circuit connection terminals, a plurality of main wiring lines each having one end connected to each of the plurality of external circuit connection terminals, and peripheral driving circuits connected to the other ends of the main wiring lines, the peripheral driving circuits driving the pixel portions based on electric signals supplied from the external circuit connection terminals through the main wiring lines. In addition, the plurality of main wiring lines are made of the same conductive film and are planarly laid out so as not to intersect each other in the peripheral region.

According to the electro-optical device of the invention, during the operation thereof, various electric signals, such as image signals, clock signals, inverse signals, power source signals, and control signals are supplied to the peripheral driving circuits connected to the other ends of the main wiring lines through the external circuit connection terminals and the main wiring lines each having one end connected to each of the external circuit connection terminals. Counter electrode potential is supplied to the upper and lower conduction terminals provided in the peripheral region through the external circuit connection terminals and the main wiring lines each having one end connected to each of the external circuit connection terminals. The counter electrode potential is supplied to counter electrodes provided on the counter substrate through the upper and lower conduction materials. The scanning lines and the data lines are driven by the various electric signals supplied as mentioned above by the peripheral driving circuits such as the scanning line driving circuits and the data line driving circuits so that the main wiring lines display images by a predetermined method. For example, the plurality of pixel portions may be active matrix driven.

According to the electro-optical device of the invention, in particular, the plurality of main wiring lines are made of the same conductive film and are planarly laid out in the peripheral region so as not to intersect each other. Therefore, when the conductive film having excellent conductivity is included in the laminated structures established on the element substrate to thus be used as the above-mentioned same conductive film, or when the conductive film having the most excellent conductivity among the laminated structures established on the element substrate is used as the above-mentioned same conductive film, it is possible to establish the plurality of main wiring lines as wiring lines having excellent conductivity. Also, even if the number of main wiring lines or the number of external circuit connection terminals increases as the driving method becomes complicated, since the plurality of main wiring lines are planarly laid out so as not to intersect each other, it is not necessary to provide the relay wiring portions in the intersections.

When the main wiring lines are made of the conductive film having the lowest resistance among the laminated structures established on the element substrate such as aluminum, it is possible to remarkably reduce the resistance of the main wiring lines compared with the case in which the relay wiring line portions made of another conductive film in the laminated structures, whose resistance is now higher, are used. Therefore, it is possible to effectively prevent the picture quality from deteriorating due to the increase in the resistance of the main wiring lines. In other words, it is possible to improve the picture quality by reducing the pixel pitch or the wiring line pitch while miniaturizing the device by reducing the size of the peripheral region.

Also, since it is not necessary to provide the relay wiring line portions in the main wiring lines as mentioned above, it is possible to prevent the resistance from increasing due to the contact resistance or the contact hole resistance in the main wiring lines, and it is possible to simplify the laminated structures on the element substrate and the manufacturing processes. Therefore, it is possible to improve the reliability and the production yield of the device. Furthermore, it is possible to remarkably reduce the mutual interference between the two kinds of electric signals carried by the two main wiring lines, which occurs when the two main wiring lines intersect each other through a thin interlayer insulating film, by planarly laying out the plurality of main wiring lines so as not to intersect each other.

According to the electro-optical device of the invention, it can be possible to effectively reduce the resistance of the main wiring lines and to prevent mutual interference among the signals of the main wiring lines. As a result, it is possible to display high quality images.

According to an aspect of the electro-optical device of the invention, sub-wiring lines can include at least one of internal wiring lines of the peripheral driving circuits, extending wiring lines extended from the peripheral driving circuits toward the pixel portions, and branch wiring lines branched from the main wiring lines, and first portions of the sub-wiring lines are made of a conductive film different from the same conductive film and is planarly laid out so as to intersect the main wiring lines with an interlayer insulating film therebetween in the peripheral region, and second portions thereof are formed of the same conductive film and are planarly laid out so as not to intersect the main wiring lines in the peripheral region.

According to this aspect, sub-wiring lines such as the internal wiring lines, extending wiring lines, and branch wiring lines can be provided in the peripheral region. Among them, the internal wiring lines of the peripheral driving circuits connect the plurality of arranged circuits that constitute a shift register in the peripheral driving circuits to each other.

The extending wiring lines extend the scanning lines, the data lines, and the capacitance lines from the image display region to the peripheral region. The branch wiring lines supply various electric signals commonly used in the plurality of peripheral driving circuits, such as the power source signals and the clock signals.

In the sub-wiring lines, in the above-mentioned first portion, second and third film layers are laminated onto a conductive film having the most excellent conductivity separated by an interlayer insulating film. The sub-wiring lines are planarly laid out so as to intersect the main wiring lines. Also, the second portion is made of the conductive film having the excellent conductivity like the main wiring line, and is planarly laid out so as not to intersect the main wiring lines. Therefore, it is possible to improve the conductivity of the sub-wiring lines as long as the sub-wiring lines do not conflict with the main wiring lines.

According to this aspect, the first portion and the second portion of the sub-wiring lines are electrically connected to each other through contact holes formed in the interlayer insulating film.

According to this structure, the sub-wiring lines may function as one wiring line composed of the first portion and the second portion that extend in a state of intersecting each other through contact holes so as to avoid the main wiring lines. Alternatively, it is possible to connect the first portion to the second portion by methods other than the method of using the contact hole.

According to another aspect of the electro-optical device of the invention, the electro-optical device further can further include a counter electrode provided in the peripheral region on a counter substrate arranged to face the element substrate, and upper and lower conduction terminals provided in the peripheral region on the element substrate, in order to connect a counter electrode potential line for supplying counter electrode potential to the counter electrode, which is at least one of the plurality of main wiring lines, and the counter electrode, the counter electrode potential line of the plurality of main wiring lines is positioned near the edges of the element substrate in the peripheral region, and the peripheral driving circuits are positioned nearer the center of the element substrate than both the upper and lower conduction terminals and the counter electrode potential line in the peripheral region.

According to this aspect, during operation, the counter electrode potential is supplied to the upper and lower conduction terminals provided in the peripheral region through the external circuit connection terminals and the main wiring lines each having one end connected to each of the external circuit connection terminals. The counter electrode potential is supplied to the counter electrodes provided on the counter substrate through the upper and lower conduction materials mounted on the upper and lower conduction terminals. Therefore, vertical electric fields are generated between the counter electrodes and the pixel electrodes provided in the pixel portions to thus drive an electro-optical material such as a liquid crystal interposed between the two substrates. In particular, in the peripheral region, the counter electrode potential lines are positioned near the edges of the element substrate among the plurality of main wiring lines. For example, the counter electrode potential lines extend along the edges of the element substrate from the external connection terminals. Since the peripheral driving circuits are positioned nearer the center of the element substrate than the upper and lower conduction terminals and the counter electrode potential lines, it is possible to simply obtain a plane layout in which the main wiring lines excluding the counter electrode potential lines do not intersect the counter electrode potential lines.

Preferably, the counter electrode potential line of the plurality of main wiring lines is positioned near the edges of the element substrate in the peripheral region. Therefore, it is possible to simply obtain the plane layout in which all of the main wiring lines excluding the counter electrode potential lines do not intersect the counter electrode potential lines.

According to this aspect, the plurality of external circuit connection terminals may be arranged along one side of the element substrate, and the external circuit connection terminal of the plurality of the external circuit connection terminals, which is connected to one end of the counter electrode potential line, may be positioned near the end of an array of the plurality of external circuit connection terminals. According to this structure, in the peripheral region, the counter electrode potential lines extend from the external circuit connection terminals near the edges and are thus routed near the edges of the element substrate. Therefore, it is possible to simply obtain a plane layout in which the main wiring lines excluding the counter electrode potential lines do not intersect the counter electrode potential lines.

In addition, the external circuit connection terminal, which is connected to one end of the counter electrode potential line, is positioned at the end in the arrangement of the plurality of external circuit connection terminals in the peripheral region. For example, near the position in which the plurality of external circuit connection terminals are arranged, the tips of the counter electrode potential lines that extend along the right edge of the element substrate are connected to the rightmost external circuit connection terminal and the tips of the counter electrode potential line that extends along the left edge of the element substrate are connected to the leftmost external circuit connection terminal. Therefore, in the peripheral region near the external circuit connection terminals, it is possible to simply obtain the plane layout in which all of the main wiring lines excluding the counter electrode potential lines do not intersect the counter electrode potential lines.

According to another aspect of the electro-optical device of the invention, the electro-optical device further includes a counter electrode provided in the peripheral region on a counter substrate arranged to face the element substrate, and upper and lower conduction terminals provided in the peripheral region on the element substrate, in order to connect a counter electrode potential line for supplying counter electrode potential to the counter electrode, which is at least one of the plurality of main wiring lines, and the counter electrode. Also, the counter electrode potential line can be positioned nearer the edges of the element substrate than the one or plurality of main wiring lines excluding the counter electrode potential lines and nearer the center of the element substrate than the other or plurality of main wiring lines excluding the counter electrode potential line in the peripheral region, a part of the peripheral driving circuits is partially positioned nearer the center of the element substrate than the upper and lower conduction terminals and the counter electrode potential line in the peripheral region, and the other parts of the peripheral driving circuits are partially positioned nearer the edges of the element substrate than the upper and lower conduction terminals and the counter electrode potential lines in the peripheral region.

According to this aspect, during operation, the counter electrode potential can be supplied to the upper and lower conduction terminals provided in the peripheral region through the external circuit connection terminals and the main wiring lines each having one end connected to each of the external circuit connection terminals. The counter electrode potential is supplied to the counter electrodes provided in the counter substrate through the upper and lower conduction materials. In particular, in the peripheral region, the counter electrode potential lines are positioned nearer the edges of the element substrate than the one or plurality of main wiring lines excluding the counter electrode potential lines. On the other hand, in the peripheral region, the counter electrode potential lines are positioned nearer the center of the element substrate than the other or plurality of main wiring lines excluding the counter electrode potential lines. Therefore, it is possible to simply obtain the plane layout in which the main wiring lines excluding the counter electrode potential lines do not intersect the counter electrode potential lines.

According to this aspect, the plurality of external circuit connection terminals may be arranged along one side of the element substrate, and the external circuit connection terminal of the plurality of external circuit connection terminals, which is connected to the one end of one or plurality of main wiring lines excluding the counter electrode potential lines, may be positioned near the end of an array of the plurality of external circuit connection terminals.

According to this structure, in the peripheral region, the other one or plurality of main wiring lines excluding the counter electrode potential lines extend from the external circuit connection terminals near the edges and thus are routed near the edges of the element substrate. On the other hand, the one or plurality of main wiring lines excluding the counter electrode potential lines extend from the external circuit connection terminals near the center and thus are routed near the center of the element substrate. Therefore, it is possible to simply obtain the plane layout in which the main wiring lines excluding the counter electrode potential lines do not intersect the counter electrode potential lines.

According to various aspects having the above-mentioned counter electrodes, the plurality of main wiring lines may include a pair of clock signal lines that supply a clock signal and an inverse signal thereof as electric signals, respectively, and that do not intersect the counter electrode potential line.

According to the above structure, since the clock signal lines and the counter electrode potential lines which remarkable mutual interference occurs if they intersect each other do not intersect each other, it is possible to effectively prevent the electric potential of the clock signals from changing in accordance with the changes in the counter electrode potential or to prevent the counter electrode potential from changing in accordance with the changes in the electric potential of the clock signals. Therefore, it is possible to display high quality images.

According to another aspect of the electro-optical device of the invention, the plurality of main wiring lines can include a pair of clock signal lines for supplying a clock signal and an inverse signal thereof as electric signals and power source wiring lines for supplying power source signals as electric signals and the pair of signal lines and power source wiring lines do not intersect each other. According to this aspect, since the clock signal lines and the power source wiring lines therebetween which remarkable mutual interference occurs if they intersect each other do not intersect each other, it is possible to effectively prevent the electric potential of the clock signals from changing in accordance with the changes in the electric potential of the power source signals or to prevent the electric potential of the power source signals from changing in accordance with the changes in the electric potential of the clock signals. Therefore, it is possible to display high quality images.

According to another aspect of the electro-optical device of the invention, the plurality of main wiring lines are planarly laid out so that the main wiring lines travel in zigzags so as not to intersect each other. According to this aspect, the main wiring lines travel in zigzags so as to prevent the main lines from intersecting each other although the length of the main wiring lines increases. It is possible to reduce the resistance of the wiring line to offset the increased length of the wiring line by reducing the resistance of the same conductive film that constitutes the main wiring lines and to obtain advantages by not using relay wiring lines required for the intersections among the main wiring lines.

Also, according to this aspect, the main wiring lines are preferably planarly laid out so that the number of intersections is mathematically or geometrically minimal and are preferably arranged to reduce the number of intersections in spite of being in zigzags. On the other hand, it can be possible to lay out the main wiring lines and the sub-wiring lines in the peripheral region in plan view while increasing the wiring line pitch and preventing the main wiring lines from intersecting each other by allowing the above-mentioned sub-wiring lines to intersect each other.

According to another aspect of the electro-optical device of the invention, the plurality of main wiring lines can include at least partially redundant wiring lines composed of a different conductive film formed in a layer different from the same conductive film. According to this aspect, since the main wiring lines include the redundant wiring lines composed of other conductive films formed in other layers as well as the wiring line portions composed of the same conductive film, it is possible to reduce the resistance of the main wiring lines. Furthermore, even if one of the two wiring line portions that constitute the redundant structure is short-circuited, the redundant wiring line may function as a wiring line. Therefore, it is possible to improve the reliability of the electro-optical device.

In addition, an electro-optical device according to the invention can include a plurality of pixel portions provided in an image display region on an element substrate, a plurality of external circuit connection terminals provided in a peripheral region of the image display region on the element substrate, scanning line driving circuits, a data line driving circuit, scanning line driving circuit wiring lines each having one end connected to each of the external circuit connection terminals and having the other ends connected to the scanning line driving circuits, data line driving circuit wiring lines each having one end connected to each of the external circuit connection terminals and having the other ends connected to the data line driving circuit, and image signal wiring lines each having one end connected to each of the external circuit connection terminals, the image signal wiring lines supplying image signals of the plurality of pixel portions. Also, the scanning line driving circuit wiring lines, the data line driving circuit wiring lines, and the image signal wiring lines are planarly laid out so as not to intersect each other in the peripheral region.

According to an aspect of the electro-optical device of the invention, the image signal wiring lines can be arranged between the scanning line driving circuit wiring lines and the data line driving circuit wiring lines.

According to another aspect of the electro-optical device of the invention, the electro-optical device can further include a counter electrode provided in the peripheral region on the counter substrate arranged to face the element substrate, and a counter electrode potential line having one end connected to the external circuit connection terminals and having the other end for supplying counter potential to the counter electrode, and the counter electrode potential line may be arranged so as to surround the scanning line driving circuit wiring lines.

An electronic apparatus according to the invention can include the electro-optical device according to the above-mentioned invention (including various aspects).

Since the electronic apparatus according to the invention includes the above-mentioned electro-optical device according to the invention, it is possible to realize various electronic apparatuses, such as television sets, mobile telephones, electronic organizers, word processors, view finder type or monitor direct view type video tape recorders, work stations, picture telephones, POS terminals, and touch panels capable of displaying high quality images since various electric signals are appropriately supplied by the main wiring lines. Also, it is possible to realize electrophoresis devices, such as electronic papers as the electronic apparatus according to the present invention.

BRIEF DESCRIPTION OF THE DRAWINGS

The invention will be described with reference to the accompanying drawings, wherein the numerals reference like elements, and wherein.

DETAILED DESCRIPTION OF PREFERRED EMBODIMENTS

The effects and other advantages of the invention will become apparent from the following preferred embodiments of the invention.

Hereinafter, the embodiments of the invention will now be described with reference to the drawings. According to the following embodiments, an electro-optical device according to the invention is applied to a TFT active matrix driving liquid crystal device.

Figure 1:
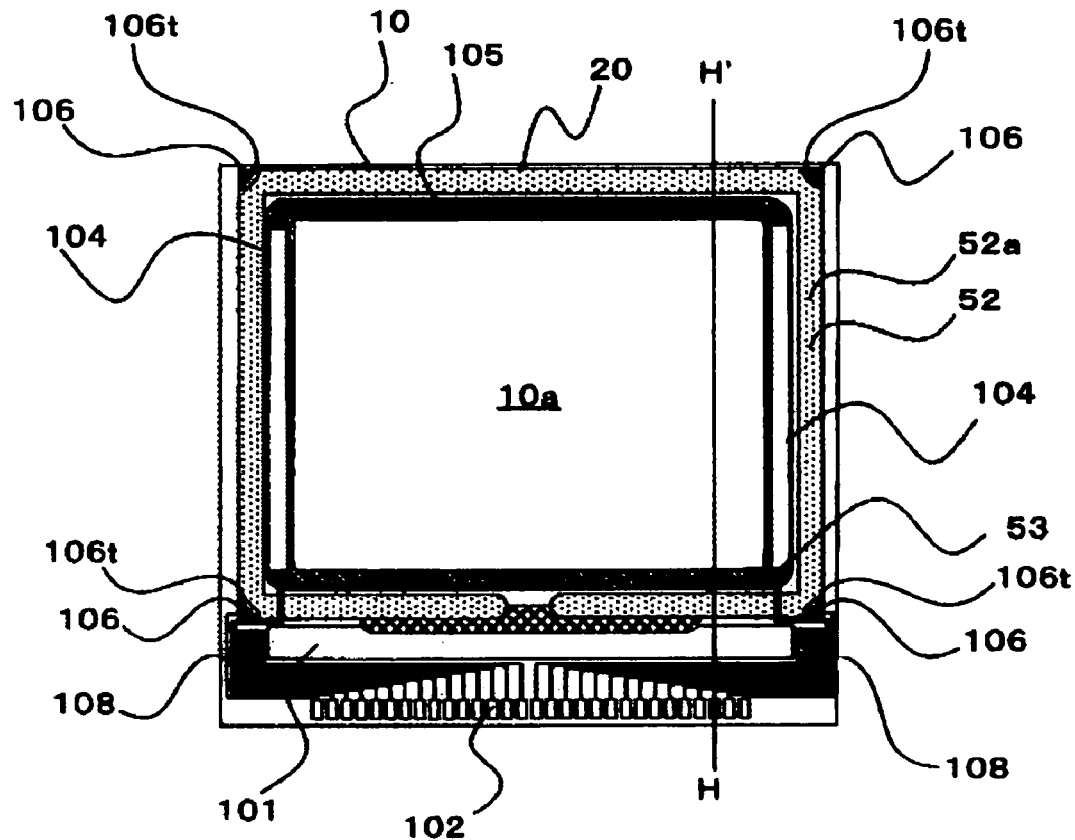
FIG. 1 is a plan view illustrating the entire structure of an electro-optical device according to an embodiment of the present invention.
Figure 2:
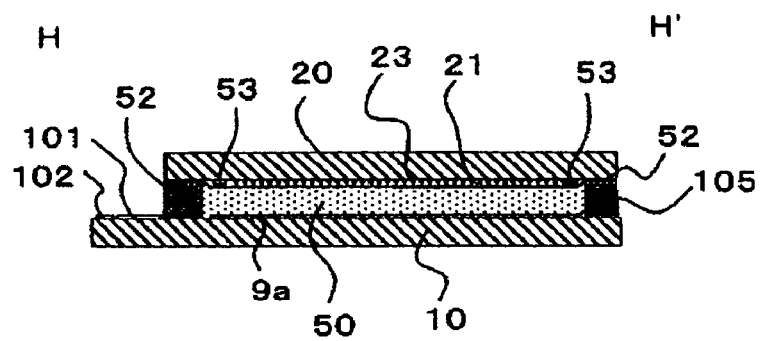
FIG. 2 is a sectional view taken along the line H–H' of FIG. 1.

The entire structure of the electro-optical device according to the present embodiment will now be described with reference to FIGS. 1 and 2. Here, FIG. 1 is a plan view illustrating the entire structure of the electro-optical device according to the present embodiment. FIG. 2 is a sectional view taken along the line H–H' of FIG. 1. Here, a driving circuit built-in TFT active matrix driving liquid crystal device that is an example of an electro-optical device is taken as an example.

In FIGS. 1 and 2, in the electro-optical device according to the present embodiment, a TFT array substrate 10 and a counter substrate 20 are arranged to face each other. A liquid crystal layer 50 is sealed between the TFT array substrate 10 and the counter substrate 20. The TFT array substrate 10 and the counter substrate 20 are attached to each other by a seal material 52 provided in a seal region 52a positioned around an image display region 10a.

The seal material 52 is made of a photocurable resin and a thermosetting resin for attaching the two substrates to each other. After coating the TFT array substrate 10 with the seal material 52 during the manufacturing process, the seal material 52 is hardened by radiating ultraviolet rays onto the same and heating the same. Also, in the seal material 52, gap materials, such as glass fibers or glass beads, for setting the distance (the gap between the substrates) between the TFT array substrate 10 and the counter substrate 20 as a predetermined value are dispersed. Instead of or in addition to dispersing the gap materials in the seal material 52, in particular, in the case of a large electro-optical device, the gap materials may be dispersed in the liquid crystal layer 50.

In parallel to the inside of the seal region 52a where the seal material 52 is arranged, a frame light-shielding film 53 having a light-shielding property, that defines the frame region of the image display region 10a is provided on the side of the counter substrate 20. However, a part or all of the frame light-shielding film 53 may be provided as a built-in light-shielding film on the side of the TFT array substrate 10.

According to the present embodiment, a peripheral region can be defined around the image display region 10a. That is, as viewed from the center of the TFT array substrate 10, the portion positioned nearer the edge than the frame light-shielding film 53 is defined as the peripheral region.

In the peripheral region, the region positioned outside the seal region 52a can include a data line driving circuit 101 and external circuit connection terminals 102, which are provided along one side (that is, the lower side in FIG. 1) of the TFT array substrate 10. Scanning line driving circuits 104 are provided along two sides (that is, the left and right sides in FIG. 1) adjacent to the one side so as to be covered with the frame light-shielding film 53. Also, in order to connect with each other the two scanning line driving circuits 104 provided on both sides of the image display region 10a, along the remaining one side (that is, the upper side in FIG. 1) of the TFT array substrate 10, a plurality of wiring lines 105 are provided so as to be covered with the frame light-shielding film 53.

According to the present embodiment, in particular, a plurality of main wiring lines 108 each having one end connected to each of the external circuit connection terminals 102 are provided in the peripheral region. The other ends of the main wiring lines 108 are connected to the data line driving circuit 101 and the scanning line driving circuits 104. Also, the structures and the operations of the circuits on the TFT array substrate 10 and a plane layout of the main wiring lines 108 will now be described in detail.

In FIG. 2, on the TFT array substrate 10, an alignment film can be formed on a pixel electrode 9a after wiring lines such as pixel switching TFTs, scanning lines, and data lines are formed. On the other hand, a light-shielding film 23 in a matrix or in stripes is formed on the counter substrate 20 excluding a counter electrode 21, followed by a topmost layer of alignment film. Also, the liquid crystal layer 50 is made of liquid crystal obtained by mixing one kind or various kinds of nematic liquid crystal with each other and is in a predetermined alignment state between the pair of alignment films.

In FIG. 1, upper and lower conduction terminals 106t connected to one counter electrode potential line which is one of the main wiring lines 108 planarly laid out on the TFT array substrate 10 are provided in the vicinity of the four corners of the TFT array substrate 10. The upper and lower conduction materials 106 are arranged on the upper and lower conduction terminals 106t. The upper and lower conduction materials 106 contact the four corners of the counter electrode 21 and supply the counter electrode potential from the external circuit connection terminals 102 through the main wiring lines 108 to the counter electrode 21.

Next, the structure of the pixel portion of the electro-optical device according to the embodiment of the invention will now be described with reference to FIG. 3. Here, FIG. 3 is an equivalent circuit diagram illustrating various elements and wiring lines in a plurality of pixels formed in a matrix, which constitute the image display region of the electro-optical device.

Figure 3:
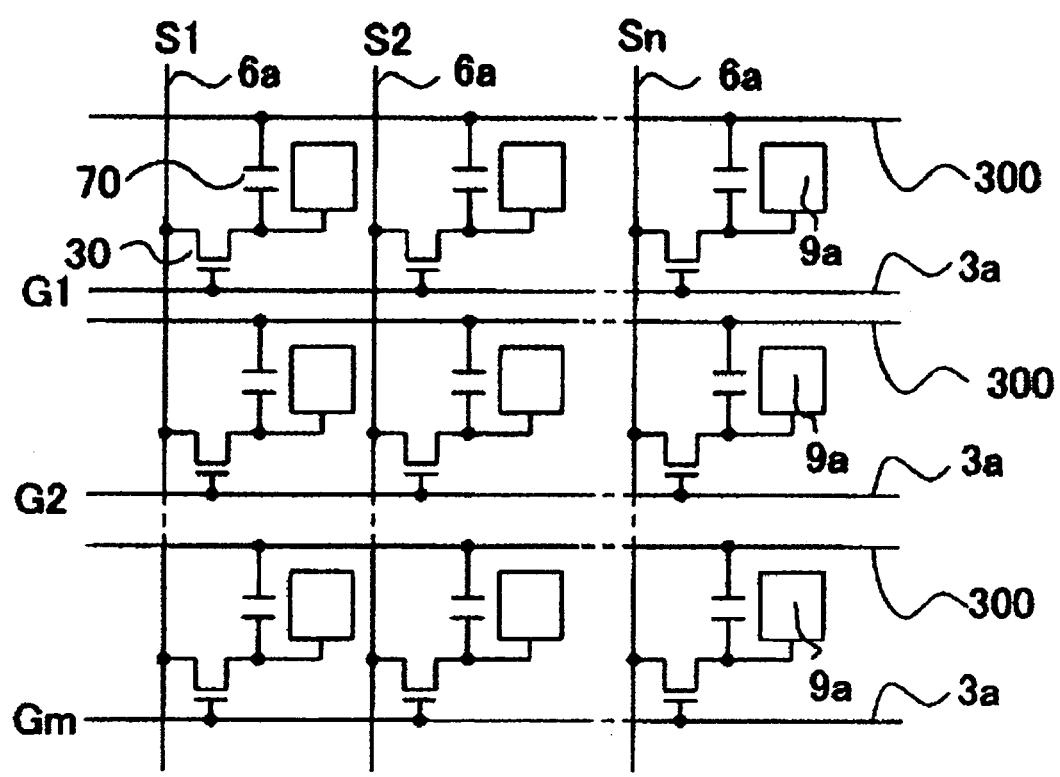
FIG. 3 is an equivalent circuit diagram illustrating various elements and wiring lines in a plurality of pixels formed in a matrix, which constitute the image display region of the electro-optical device.

In FIG. 3, pixel electrodes 9a and TFTs 30 for switch controlling the pixel electrodes 9a are provided in the plurality of pixel portions formed in a matrix in the image display region 10a (refer to FIG. 1) of the electro-optical device according to the present embodiment, respectively. Data lines 6a to which image signals S1, S2, . . . , and Sn (to be described in greater detail below) are supplied are electrically connected to the sources of the TFTs 30.

In addition, the scanning lines 3a are electrically connected to the gates of the TFTs 30 so as to apply linearly and sequentially scanning signals G1, G2, . . . , and Gm to the scanning lines 3a in pulse at a predetermined timing. The pixel electrodes 9a are electrically connected to the drains of the TFTs 30 so as to write the image signals S1, S2, . . . , and Sn supplied from the data lines 6a at a predetermined timing by switching off the switches of the TFTs 30 that are switching elements for only a predetermined period of time.

The image signals S1, S2, . . . , Sn of a predetermined level, which are written in the liquid crystal as an example of an electro-optical material through the pixel electrodes 9a are held between the pixel electrodes and the counter electrodes 21 formed on the counter substrate for a predetermined period. In the liquid crystal, the alignment or the order of molecular association changes in accordance with the level of an applied voltage, thereby being able to modulate light and to display gray scales. In case of a normally white mode, the transmittance ratio of incident light decreases in accordance with the voltage applied in each pixel unit, while in case of a normally black mode, the transmittance ratio of incident light increases in accordance with the voltage applied to each pixel unit. Therefore, light having contrast in proportion to the image signals emits from the electro-optical device as a whole.

Here, in order to prevent the held image signals from leaking, storage capacitors 70 are additionally provided in parallel to the liquid crystal capacitors formed between the pixel electrodes 9a and the counter electrodes 21 (refer to FIGS. 1 and 2). The storage capacitors 70 are provided in parallel to the scanning lines 3a and include capacitance electrodes having a fixed electric potential and capacitance lines 300 having a predetermined electric potential. The storage capacitors 70 improve the charge holding characteristics of the pixel electrodes. Also, the electric potential of the capacitance lines 300 may be always fixed to one voltage value or may be fixed to a plurality of voltage values while fluctuating over a predetermined period.

Figure 4:
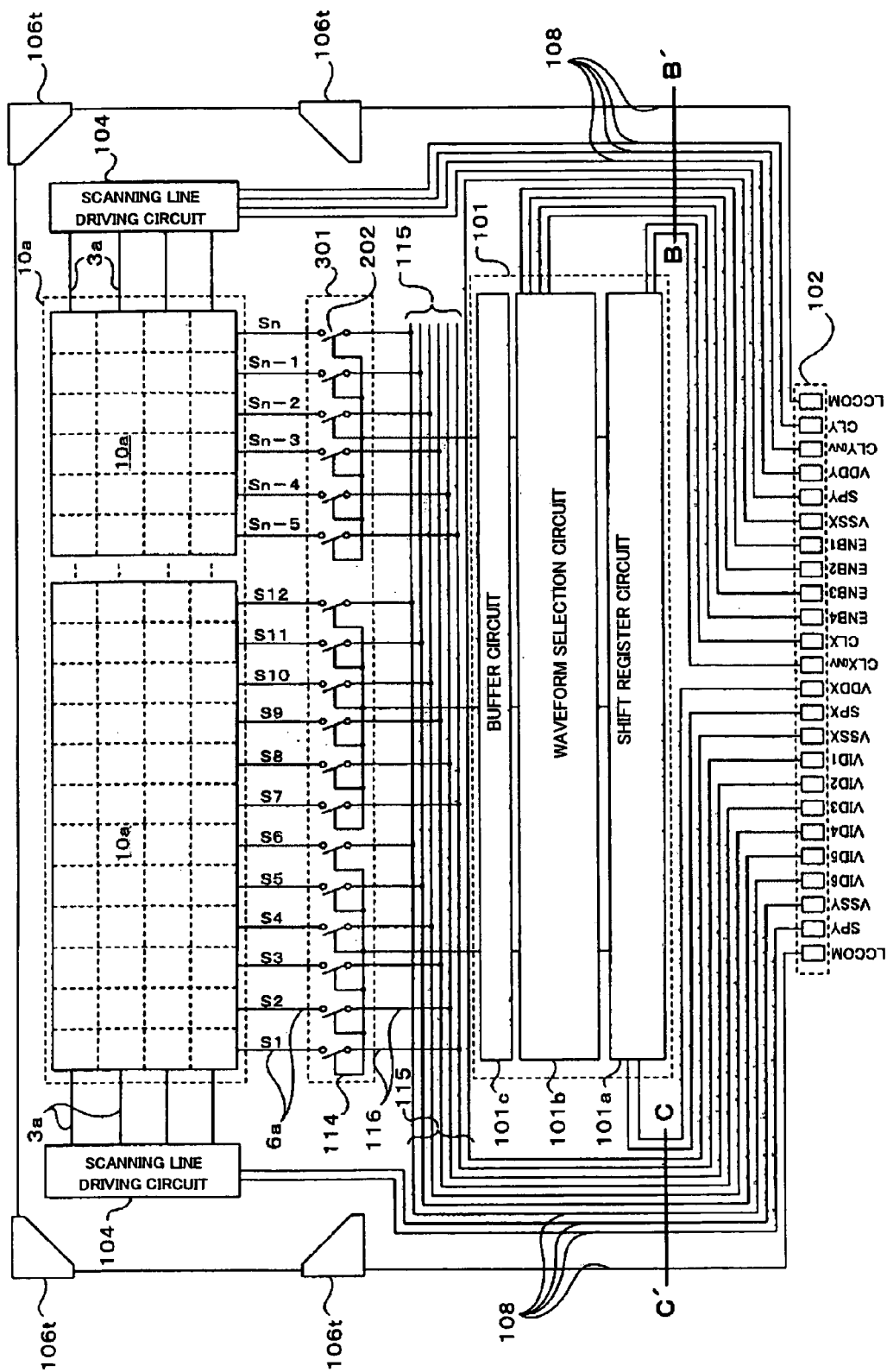
FIG. 4 is an equivalent circuit diagram illustrating the structures of various driving circuits and various signal wiring lines formed on a TFT array substrate.
Figure 5:
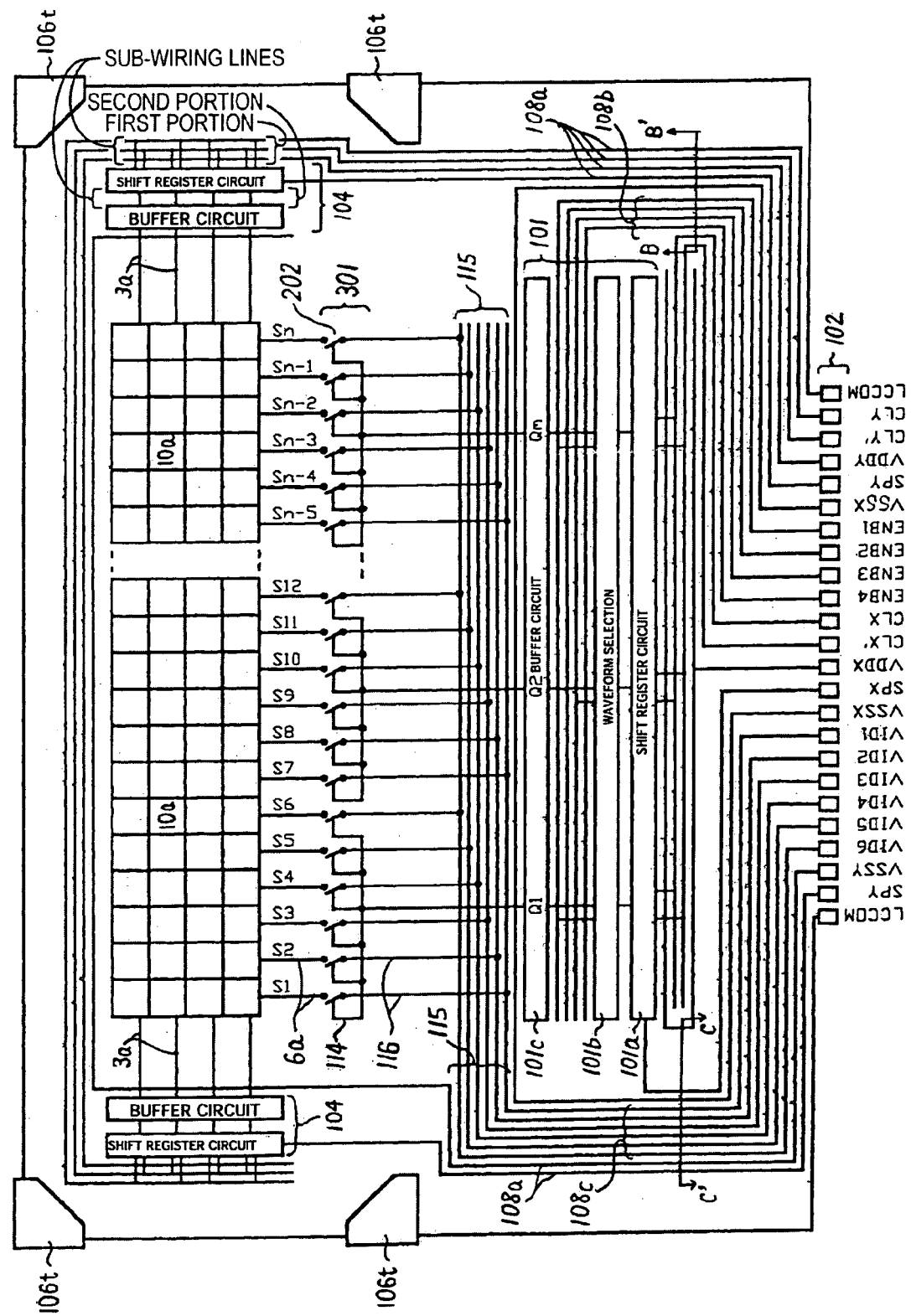
FIG. 5 is an equivalent circuit diagram illustrating the structures of various driving circuits and various signal wiring lines formed on a TFT array substrate.

Subsequently, the structures of the circuits and the plane layout of the main wiring lines on the TFT array substrate of the electro-optical device according to the present embodiment will now be described with reference to FIGS. 4 and 5. Here, FIG. 4 is an equivalent circuit diagram illustrating the structures of various driving circuits and various signal wiring lines formed on the TFT array substrate. FIG. 5 is an equivalent circuit diagram illustrating the structures of various driving circuits and various signal wiring lines, in which FIG. 4 is described in greater detail. Also, hereinafter, signal names and signal wiring lines input to the TFT array substrate 10 through the external circuit connection terminals 102 are referred to by an abbreviation representing the signals and adding the letter L to represent the line carrying that signal. That is, for example, the signal wiring line of a "clock signal CLX" being a signal name is referred to as a "clock signal line LCLX".

As illustrated in FIGS. 4 and 5, the data line driving circuit 101 and sampling circuits 301, can supply image signals to the data lines 6a, and the scanning line driving circuits 104, can supply scanning signals to the scanning lines 3a are formed as driving circuits of the electro-optical device on the TFT array substrate 10. Also, the external circuit connection terminals 102 including a plurality of terminals for inputting various signals supplied to the driving circuits from external control circuits are formed along one side of the TFT array substrate 10 (refer to FIG. 1). The main wiring lines 108 are provided from the external circuit connection terminals 102.

The data line driving circuit 101 includes a shift register circuit 101a, a waveform selection circuit 101b, and a buffer circuit 101c as main components. The shift register circuit 101a starts a transferring operation in accordance with a start signal SPX supplied from the external control circuits using a negative power source VSSX and a positive power source VDDX supplied from the external control circuits through the external circuit connection terminals 102 and a wiring line LVSSX and a wiring line LVDDX of the main wiring lines 108 as power sources. Next, transfer signals are sequentially output to the waveform selection circuit 101b at a predetermined timing based on a clock signal CLX and an antiphase clock signal $CLX_{INV}$ for the shift register circuit 101a, which are supplied through the external circuit connection terminals 102 and a clock signal line LCLX and an antiphase clock signal line $LCLX_{INV}$ of the main wiring lines 108.

The waveform selection circuit 101b referred to as an enable circuit restricts the pulse widths of the transfer signals sequentially output from the shift register circuit 101a to the pulse widths of enable signals ENB1 to ENB4 input from the external control circuits through the external circuit connection terminals 102 to thus define the respective sampling periods in the following sampling circuits 301. More specifically, the waveform selection circuit 101b is provided corresponding to each stage of the above-mentioned shift register circuit 101a. For example, the selection of a waveform in a temporal axis is controlled so that data lines 6a are driven only when the transfer signals formed by a NAND circuit and an inverter, then sequentially output from the shift register circuit 101a are at a high level and any one of the enable signals ENB1 to ENB4 is at a high level.

The buffer circuit 101c buffers the transfer signal whose waveform is selected and supplies the transfer signal as a sampling circuit driving signal to the sampling circuits 301 through sampling circuit driving signal lines 114. The buffer circuit 101c also may perform signal processings such as a level shift processing and an inverting processing.

The sampling circuits 301 include a plurality of TFTs 202 that is an example of switching circuit elements for sampling the image signals. However, as shown in the drawing, first conductive channel TFTs, n-channel TFTs, or p-channel TFTs may be used as the switching circuit elements. Also, complementary TFTs may be also used as the switching circuit elements. The lower ends of the data lines 6a in FIG. 3 are connected to the drains of the TFTs 202. Image signal lines 115 are connected to the sources of the TFTs 202 through extending wiring lines 116. At the same time, the sampling circuit driving signal lines 114 connected to the data line driving circuit 101 are connected to the gates of the TFTs 202. Image signals VID1 to VID6 on the image signal lines 115 are sampled by the sampling circuits 301 as the sampling circuit driving signals are supplied from the data line driving circuit 101 through the sampling circuit driving signal lines 114 and are supplied to the respective data lines 6a.

The image signals S1, S2, . . . , and Sn supplied from the external circuit connection terminals 102 through the main wiring lines 108 and written in the data lines 6a by the sampling circuits 301 as mentioned above may be linearly and sequentially supplied in this order. However, according to the present embodiment, each of the image signals S1, S2, . . . , and Sn is supplied to each set composed of six data lines 6a corresponding to the image signals VID1 to VID6 serial-parallel developed into six phases. The number of phases is not restricted to six phases. For example, image signals developed into nine, twelve, or twenty-four phases may be supplied to each set of data lines 6a whose number corresponds to the number of developed phases.

The scanning line driving circuits 104 include the shift register circuits and the buffer circuits as components and start a transfer operation to the built-in shift register circuits in accordance with a start signal SPY supplied from the external control circuits using the negative power source VSSY and the positive power source VDDY supplied from the external control circuits through the external circuit connection terminals 102 and the wiring line LVSSY and the wiring line LVDDY of the main wiring lines 108 as power sources. Subsequently, the scanning line driving circuits 104 linearly and sequentially apply the scanning signals to the above-mentioned scanning lines 3a in pulse at a predetermined timing based on the clock signal CLY and the antiphase clock signal $CLY_{INV}$ for the built-in shift register circuits, which are supplied through the external circuit connection terminals 102 and the clock signal line LCLY and the antiphase clock signal line $LCLY_{INV}$ of the main wiring lines 108.

On the TFT array substrate 10, counter electrode potential line LLCCOM which is one of the main wiring lines 108 passes through the four corners of the TFT array substrate 10 while being connected to the upper and lower conduction terminals 106t. A predetermined electric potential is supplied to the counter electrodes 21 through the upper and lower conduction materials 106, the upper and lower conduction terminals 106t, and the counter electrode potential line LLCCOM. It is possible to drive the liquid crystal interposed between the two electrodes, that is, the pixel electrode 9a and the counter electrode 21 as mentioned above by supplying the electric potential.

According to the present embodiment, in particular, the scanning line driving circuits 104 are arranged further inside than the seal region 52a illustrated in FIG. 1. That is, in FIGS. 4 and 5, the scanning line driving circuits 104 are arranged to be closer to the center of the TFT array substrate 10 than the counter electrode potential lines LLCCOM provided along the edges of the TFT array substrate 10 so as to pass through the four upper and lower conduction terminals 106t and to surround the image display region 10a and various driving circuits. Therefore, compared with the case in which the scanning line driving circuits 104 are arranged outside the seal region 52a in the peripheral region, it is possible to reduce the space of the peripheral region in the TFT array substrate 10 and to miniaturize the entire device. Furthermore, it is possible to lay out the group of the plurality of main wiring lines 108a including the counter electrode potential lines LLCCOM and the various signal wiring lines that reach the scanning line driving circuits 104 and the group of the plurality of main wiring lines 108b including the various signal wiring lines that reach the data line driving circuit 101 in plan view without intersecting each other. Also, it is possible to lay out the group of the main wiring lines 108a that reach the scanning line driving circuits 104 in plan view without intersecting each other. Also, it is possible to lay out the group of the main wiring lines 108b that reach the data line driving circuit 101 in plan view without intersecting each other excluding intersecting portions required for being connected to the shift register 101a, the waveform selection circuit 101b, and the buffer circuit 101c. Also, it is possible to lay out the main wiring lines 108c that reach the sampling circuits 301, that is, image signal lines 115, without intersecting each other, excluding the intersecting portions required to intersect in order to be connected to the sampling circuits 301.

Next, with reference to FIGS. 4 and 5, the detailed structures of the external circuit connection terminals 102 and the various signal wiring lines connected to the external circuit connection terminals 102 will now be described. Also, hereinafter, the external circuit connection terminals of the signals input to the TFT array substrate 10 are referred to by an abbreviation representing the signals and adding the letter T to represent the terminal carrying the signal. That is, for example, the connection terminal of a "clock signal CLX" is referred to as a clock signal "terminal TCLX".

As mentioned above, the external circuit connection terminals 102 provided along one side of the TFT array substrate 10 are composed of a plurality of groups of terminals divided into four groups, one each for the counter electrode potential lines, the scanning line driving circuits, the image signals, and the data line driving circuit. More specifically, the external circuit connection terminals 102 include two terminals TLCCOM for the counter electrode potential lines LLCCOM, a terminal TSPY, a terminal TVSSY, a terminal TVDDY, a terminal TCLX, and a terminal $TCLX_{INV}$ for the scanning line driving circuits 104, terminals TVID1 to TVID6 for the image signals VID1 to VID6, and a terminal TVSSX, a terminal TSPX, a terminal TVDDX, a terminal TCLX, a terminal $TCLX_{INV}$, terminals TENB1 to TENB4, and a terminal TVSSX for the data line driving circuit 101.

According to the present embodiment, in particular, as illustrated in FIGS. 4 and 5, the two terminals TLCCOM for supplying a counter electrode potential LCCOM of the external circuit connection terminals 102 are arranged one on each end, that is, the right end and the left end. The counter electrode potential lines LLCCOM, each of whose ends are connected to one of the two terminals TLCCOM, are connected to the four upper and lower conduction terminals 106t as mentioned above so as to surround the outer circumference of the seal region 52. Alternatively, only one upper and lower conduction terminal 106t may exist.

Next, the terminal TCLY, the terminal $TCLY_{INV}$, the terminal TVDDY, and the terminal TSPY for driving the scanning line driving circuits 104 are arranged in parallel after the rightmost TLCCOM terminal in this order. On the other hand, the terminal TSPY and the terminal TVSSY for driving the scanning line driving circuits 104 are arranged in parallel in this order after the leftmost TLCCOM terminal when ordered from left to right.

Since the terminals TLCCOM for the counter electrode potential lines and the groups of terminals for the scanning line driving circuits 104 are arranged as mentioned above, it is possible to arrange the plurality of main wiring lines 108a connected to the groups of terminals for the scanning line driving circuits 104, that is, the plurality of signal wiring lines for driving the scanning line driving circuits 104, further inside (that is, closer to the center of the TFT array substrate 10) than the counter electrode potential lines LLCCOM connected to the terminals TLCCOM. As illustrated in FIG. 5, the clock signal line LCLY, the antiphase clock signal line $LCLY_{INV}$, and the wiring line LVDDY that is an electrostatic potential line are arranged outside the right scanning line driving circuit 104 and the left scanning line driving circuit 104 and inside the counter electrode potential lines LLCCOM so as to be electrically connected to the right and left scanning line driving circuits 104 rather than the right scanning line driving circuit 104 in the drawing. That is, according to the present embodiment, when the scanning line driving circuits 104 are arranged further inside than the seal region 52a, the counter electrode potential lines LLCCOM and the groups of the signal wiring lines for driving the above-mentioned scanning line driving circuits 104 do not intersect on the substrate. Therefore, the counter electrode potential lines LLCCOM and the group of the signal wiring lines 108a for driving the scanning line driving circuits 104 may be formed on the same wiring line layers and be formed simultaneously in the manufacturing processes.

When the counter electrode potential lines LLCCOM and the group of the signal wiring lines for the scanning line driving circuits 104 are formed of separate wiring line layers with an interlayer insulating film interposed so as to intersect each other in plan view, in particular, the counter electrode potential lines LLCCOM and the group of the signal wiring lines for the scanning line driving circuits 104 may interfere with each other by the noise of the signals generated from the respective signal wiring lines in the intersections. Therefore, as mentioned above, according to the present embodiment, since the counter electrode potential lines LLCCOM and the group of the signal wiring lines for the scanning line driving circuits 104 are formed of the same wiring line layers without intersecting each other in plan view, it is possible to prevent such a problem.

Furthermore, when the terminals TLCCOM that are the external circuit connection terminals 102 for supplying the counter electrode potential LCCOM and the group of terminals for driving the scanning line driving circuits 104 are arranged to establish a position relationship contrary to that illustrated in FIG. 4 or FIG. 5, that is, when the terminals TLCCOM are closer to the center, it is necessary to intersect the wiring lines connected to the respective terminals on the substrate and to thus adopt a means of connecting any one main wiring line 108 to another wiring line layer. In this case, since the separate wiring line layers are connected to each other through contact holes formed in the interlayer insulating film, the manufacturing processes become complicated and, in particular, the resistance of the wiring lines increase in the portions where the wiring line layers are connected to each other. Therefore, it is possible to easily form the counter electrode potential lines LLCCOM and the plurality of main wiring lines 108a for driving the scanning line driving circuits 104 during the manufacturing processes and to appropriately prevent signals from being delayed due to the resistance of the wiring lines by adopting the arrangement of the external circuit connection terminals 102 illustrated in FIGS. 4 and 5 according to the present embodiment, that is, by arranging the terminals TLCCOM closer to the end.

Also, when the scanning line driving circuits 104 are formed further outside than the seal region 52a, the terminals TLCCOM for supplying the counter electrode potential and the group of terminals for the scanning line driving circuits 104 are preferably arranged to establish a position relationship contrary to that of the above-mentioned example so that they do not intersect each other on the substrate. By doing so, as mentioned above, it is possible to prevent the main wiring lines 108 from intersecting each other on the substrate and to prevent the resistance of the wiring lines from increasing since none of the main wiring lines 108 is connected to another wiring line layer.

Here, according to the present embodiment, the counter electrode potential lines LLCCOM and the respective main wiring lines 108a for driving the scanning line driving circuits 104 are preferably made of a metal film or an alloy film of low resistance such as aluminum. By doing so, it is possible to reduce the time constant of the signal wiring lines and to thus prevent signals from being delayed due to the surrounding of the wiring lines. In addition, when the main wiring lines 108a are made of the metal film or the alloy film of the low resistance, the plurality of main wiring lines 108 including the counter electrode potential lines LLCCOM can be routed in zigzags so as not to intersect each other. That is, since the wiring lines travel in zigzags, the length of the wiring lines increase, thus increasing the resistance of the wiring lines. However, since the counter electrode potential lines LLCCOM and the main wiring lines 108a are made of the metal film or the alloy film of low resistance, it is possible to offset the disadvantages of increased length from being routed in zigzags. To the contrary, since it is possible to prevent the main wiring lines 108 from intersecting each other by routing the main wiring lines 108 in zigzags, it is possible to lay out more main wiring lines 108 in plan view in the restricted peripheral region.

Also, in the external circuit connection terminals 102, terminals TVID1 to TVID6 for the image signals, a terminal TVSSX, a terminal TSPX, a terminal TVDDX, a terminal TCLX, a terminal TCLX$_{INV}$, terminals TENB1 to TENB4, and a terminal TVSSX for the data line driving circuit 101 are arranged in parallel in this order after the terminal TSPY and the terminal TVSSY for the scanning line driving circuits 104, when ordered from left to right.

Here, the six image signal lines 115 that are the main wiring lines 108c connected to the terminals TVID1 to TVID6 reach the region between the sampling circuits 301 and the data line driving circuit 101 without intersecting each other on the substrate and without intersecting any other signal wiring lines connected to the external circuit connection terminals 102 on the substrate. To be specific, the image signal lines 115 are arranged between the wiring line LVSSY of the main wiring lines 108a for driving the scanning line driving circuits 104 and the wiring line LVSSX of the main wiring lines 108b for driving the data line driving circuit 101. In order to be electrically connected to the sampling circuits 301, the image signal lines 115 are connected to the extending wiring lines 116 through the contact holes (not shown). The extending wiring lines 116 are arranged so as to intersect the other image signal lines 115.

Also, the plurality of main wiring lines 108b connected to the respective terminals for the data line driving circuit, that is, the wiring line LVSSX that is an electrostatic potential line and the wiring line LVDDX that is an electrostatic wiring line, a start signal line LSPX, the clock signal line LCLX, and the antiphase clock signal line LCLX$_{INV}$, and the enable signal lines LENB1 to LENB4 are arranged so as to reach the data line driving circuit 101 without intersecting each other on the substrate and without intersecting any other main wiring lines 108 connected to the external circuit connection terminals 102 on the substrate. To be specific, the wiring line LVSSX is arranged so as to surround the data line driving circuit 101 inside the main wiring lines 108a and the main wiring lines 108c. The start signal line LSPX, the clock signal line LCLX, the antiphase clock signal line LCLX$_{INV}$, and the enable signal lines LENB1 to LENB4 that are the other main wiring lines 108b are arranged inside the wiring line LVSSX and are connected to the extending wiring lines through the contact holes so as to be electrically connected to the shift register 101a, the waveform selection circuit 101b, and the buffer circuit 101c of the data line driving circuit 101. The extending wiring lines are arranged so as to intersect the other main wiring lines 108b.

Since the external circuit connection terminals 102 are arranged as mentioned above, according to the present embodiment, the plurality of main wiring lines 108 connected to the respective terminals are arranged without intersecting each other on the substrate. Therefore, all of the main wiring lines 108 connected to the external circuit connection terminals 102 can be formed on the same wiring line layers and be formed simultaneously in the manufacturing processes. As a result, it is possible to simplify the manufacturing processes. Furthermore, as mentioned above, it is possible to prevent the main wiring lines 108 that intersect each other from interfering with each other at intersection point and to prevent the signals from being delayed due to the contact resistance or the wiring line resistance generated in the contact holes during the arrangement of the wiring lines.

According to the present embodiment, the terminals TVID1 to TVID6 for the image signals are preferably arranged so that both ends of each of the terminals TVID1 to TVID6 are inserted into the terminals for the electrostatic potential lines or the signal wiring lines that belong to a low frequency control signal, and that the terminals TVID1 to TVID6 are separated from the terminals for the signal wiring lines that belong to a high frequency control signal as far as possible. To be more specific, as illustrated in FIG. 4 or 5, the terminals TVID1 to TVID6 for the image signals are arranged so as to be inserted into the terminal TVSSY and the terminal TVSSX for the electrostatic potential lines and to be remote from the terminal TCLX$_{INV}$, the terminal TCLX, and the terminals TENB1 to TENB4 for the wiring lines that belong to the high frequency control signal for driving the data line driving circuit 101. In general, since electronic waves are reduced in proportion to the increase in the distance and the presence of the obstacles, it is possible to reduce the high frequency clock noise in the image signal lines 115 by arranging the wiring lines according to the present embodiment. That is, since the image signal lines 115 are arranged so as to be as far as possible from the group of wiring lines for the high frequency control signal, it is possible to reduce the influence of the noise. Also, the image signal lines 115 are electrically shielded from the wiring lines for the high frequency control signal by interposing the electrostatic potential lines. Therefore, it is possible to display high quality images without deteriorating the picture quality due to the influence of the noise.

Figure 6:
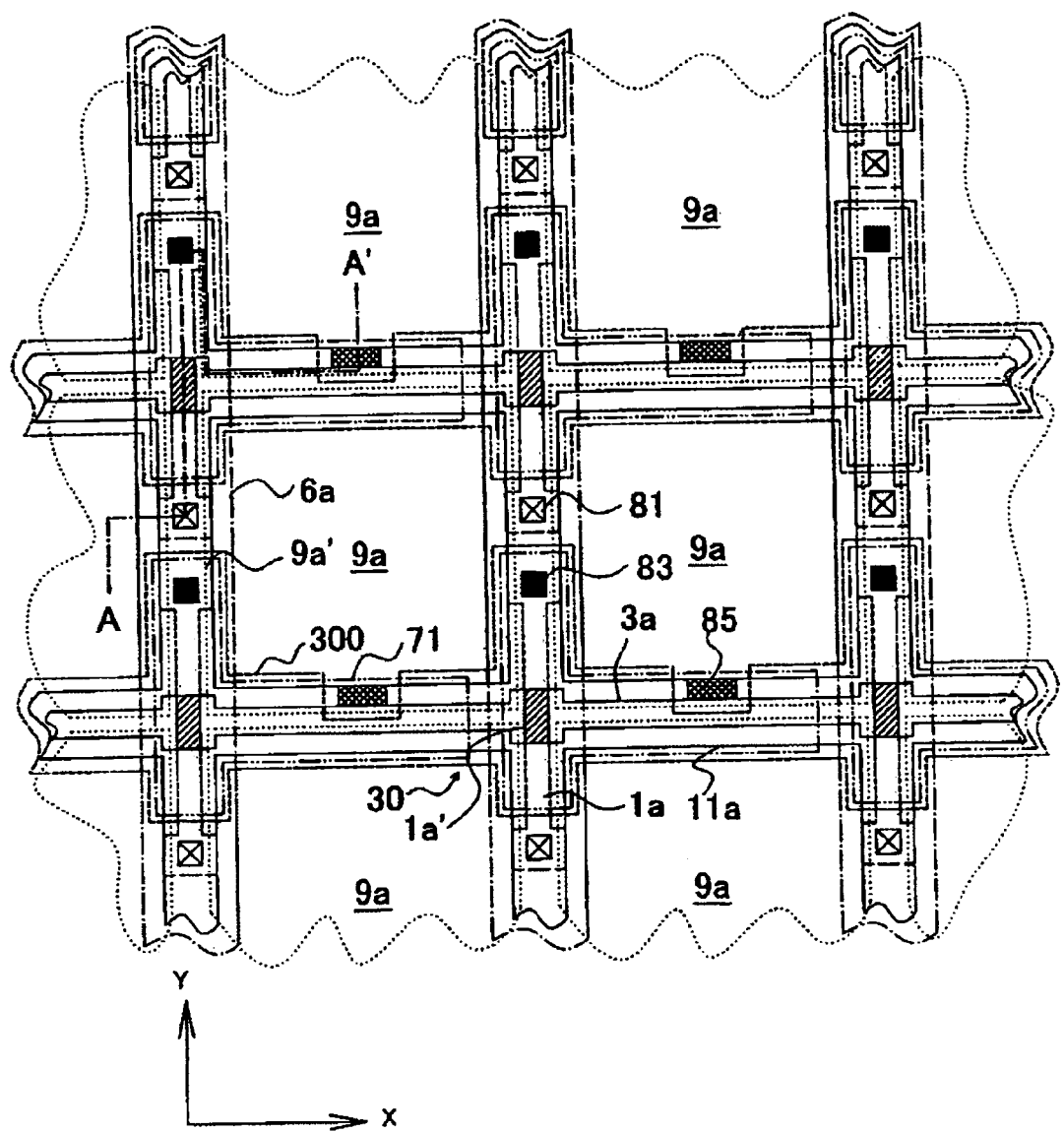
FIG. 6 is a plan view of a plurality of pixel groups adjacent to each other on the TFT array substrate on which data lines, scanning lines, and pixel electrodes are formed in the electro-optical device according to the embodiment of the present invention.
Figure 7:
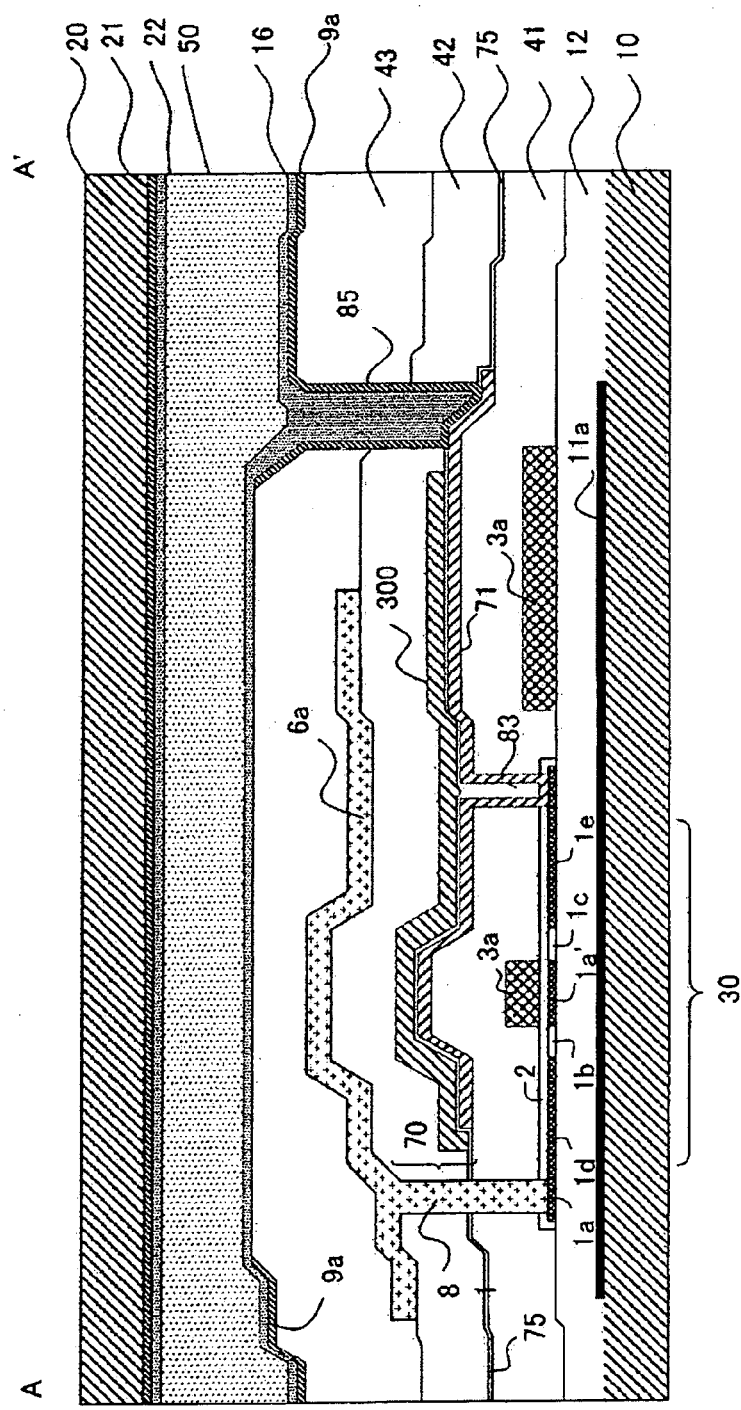
FIG. 7 is a sectional view taken along the line A–A' of FIG. 6.

The structures of the pixel portions of the electro-optical device by which the above-mentioned circuit operations are realized by the data lines 6*a*, the scanning lines 3*a*, and the TFTs 30 will now be described with reference to FIGS. 6 and 7. Here, FIG. 6 is a plan view of a plurality of pixel groups adjacent to each other on the TFT array substrate on which data lines, scanning lines, and pixel electrodes are formed in the electro-optical device according to the embodiment of the present invention. FIG. 7 is a sectional view taken along the line A–A'.

In FIG. 6, the plurality of pixel electrodes 9*a* are provided on the TFT array substrate 10 in a matrix (the outlines are denoted by the dotted line portions 9*a*'). The data lines 6*a* and the scanning lines 3*a* are formed along the horizontal and vertical boundaries, respectively, of the pixel electrodes 9*a*. The data lines 6*a* are made of the metal film or the alloy film such as aluminum film. The scanning lines 3*a* are made of the conductive poly silicon film. The scanning lines 3*a* are arranged to face channel regions 1*a*' marked with forward leaning oblique lines in semiconductor layers 1*a* and function as gate electrodes. That is, the pixel switching TFTs 30 in which the main line portions of the scanning lines 3*a* face the channel regions 1*a*' as the gate electrodes are provided in the portions where the scanning lines 3*a* intersect the data lines 6*a*.

As illustrated in FIG. 7, the electro-optical device includes the transparent TFT array substrate 10 and the transparent counter substrate 20 arranged to face the TFT array substrate 10. The TFT array substrate 10 is made of a quartz substrate, a glass substrate, or a silicon substrate. The counter substrate 20 is made of a glass substrate or the quartz substrate. The pixel electrodes 9*a* are provided above the TFT array substrate 10. The alignment film 16 on which a predetermined alignment process, such as a rubbing process, has been performed is provided on the pixel electrodes 9*a*. The pixel electrodes 9*a* are made of a transparent conductive film, such as an indium tin oxide (ITO) film. On the other hand, the counter electrodes 21 are formed over the entire surface of the counter substrate 20. An alignment film 22 on which a predetermined alignment process, such as the rubbing process, has been performed is provided under the counter electrodes 21. The counter electrodes 21 are made of the transparent conductive film such as the ITO film like the above-mentioned pixel electrodes 9*a*. The alignment films 16 and 22 are made of a transparent organic film, such as a polyimide film. The liquid crystal layer 50 is in a predetermined alignment state by the alignment films 16 and 22 in a state where electric fields are not applied from the pixel electrodes 9*a*.

As illustrated in FIG. 7, the TFTs 30 have a lightly doped drain (LDD) structure and include the scanning lines 3*a* that function as the gate electrodes as mentioned above, the channel regions 1*a*' of the semiconductor layers 1 a, which are made of the poly silicon film and whose channels are formed by the electric fields from the scanning lines 3*a*, insulating films 2 including gate insulating films for insulating the scanning lines 3*a* from the semiconductor layers 1*a*, the low concentration source regions 1*b* and the low concentration drain regions 1*c* and the high concentration source regions 1*d* and the high concentration drain regions 1*e* in the semiconductor layers 1*a*.

Also, as illustrated in FIG. 7, the TFTs 30 preferably have the LDD structure. However, the TFTs 30 may alternatively have an offset structure in which impurities are not implanted into the low concentration source regions 1*b* and the low concentration drain regions 1*c*. The TFTs 30 may be self-aligning TFTs in which high concentration impurities are implanted using the gate electrodes formed of parts of the scanning lines 3*a* as masks and the high concentration source regions and the high concentration drain regions are formed by self-matching. Also, according to the present embodiment, a single gate structure in which only one gate electrode of the pixel switching TFT 30 is arranged between the high concentration source region 1*d* and the high concentration drain region 1*e* is used. However, two or more gate electrodes may be arranged between the high concentration source region 1*d* and the high concentration drain region 1*e*. As mentioned above, when the TFT is constituted of dual gates or multiple gates, it is possible to prevent current from leaking in the portions where the channels are connected to the source and drain regions and to thus reduce the amount of current during the off state of the switch. Furthermore, the semiconductor layers 1*a* that form the TFTs 30 may be non-single crystalline layers or single crystalline layers. The single crystalline layers may be formed by a well-known method such as a contact method. It is possible to improve the performances of peripheral circuits by making the semiconductor layers 1*a* out of single crystalline layers.

On the other hand, in FIG. 7, a storage capacitor 70 is composed of the high concentration drain region 1*e* of the TFT 30 and a relay layer 71 as the pixel potential capacitance electrode connected to the pixel electrode 9*a*, and a part of the capacitance line 300 as the fixed potential capacitance electrode. The two capacitance electrodes face each other through a dielectric film 75.

The capacitance lines 300 are made of a metal monomer, an alloy, a metal silicide, or a polysilicide including some amount of at least one refractory metal such as Ti, Cr, W, Ta, or Mo, or a material obtained by laminating two or more of these materials. The capacitance lines 300 may be made of the Al film.

The relay layers 71 are made of the conductive poly silicon film and function as the pixel potential capacitance electrodes. The relay layers 71 may be made of a single layer film or a multi-layer film including a metal or an alloy like the capacitance lines 300, as described below. The relay layers 71 relay connect the pixel electrodes 9*a* to the high concentration drain regions 1*e* of the TFTs 30 through contact holes 83 and 85 via a relay, as well as function as the pixel potential capacitance electrodes.

The capacitance lines 300 function as the fixed potential capacitance electrodes and are arranged to face the relay layers 71. As illustrated in FIG. 6, the capacitance lines 300 overlap the regions in which the scanning lines 3*a* are formed in plan view. To be more specific, the capacitance lines 300 include the main line portions that extend along the scanning lines 3*a*, protrusions that protrude from the intersections between the scanning lines 3*a* and the data lines 6*a* to the upper portion along the data lines 6*a*, and connection portions corresponding to the contact holes 85. The protrusions use the regions on the scanning lines 3a and under the data lines 6a, thus increasing the available space in the regions where the storage capacitors 70 are formed. Also, the capacitance lines 300 preferably extend from the image display region 10a in which the pixel electrodes 9a are arranged into the peripheries of the image display region 10a to be electrically connected to electrostatic potential sources and to have fixed potential. As mentioned above, the electrostatic potential sources, such as the positive power source VDDX and the negative power source VSSX supplied to the data line driving circuits 101 or the counter electrode potentials LCCOM supplied to the counter electrodes 21 of the counter substrate 20 may be used as the electrostatic potential sources.

As illustrated in FIG. 7, the dielectric films 75 are made of a thin high temperature oxide (HTO) or a low temperature oxide (LTO) film having a thickness of about 5 to 200 nm such as a silicon oxide film or a silicon nitride film. In view of increasing the performance of the storage capacitors 70, the thinner the dielectric films 75 are, the better, as long as it is possible to secure sufficient reliability.

In FIGS. 6 and 7, other than the above components, lower light-shielding films 11a are provided below the TFTs 30. The lower light-shielding films 11a are patterned in a matrix to thus define the apertures of the respective pixels. The lower light-shielding films 11a are made of a single layer film or a multi-layer film including the metal or the alloy like the above-mentioned capacitance lines 300. Also, the apertures are defined by the data lines 6a in FIG. 6 and the capacitance lines 300 formed so as to intersect the data lines 6a. The lower light-shielding films 11a preferably extend from the image display region 10a into the peripheries of the image display region 10a to thence be connected to the electrostatic potential sources like the above-mentioned capacitance lines 300, in order to prevent the changes in the potential from undesirably affecting the TFTs 30.

Basic insulating films 12 are provided under the TFTs 30. The basic insulating films 12 are formed over the entire surface of the TFT array substrate 10 to thus prevent the characteristics of the pixel switching TFTs 30 from changing due to the rough surface of the abraded TFT array substrate 10 or the contaminants left after cleaning the TFT array substrate 10, as well as to insulate the TFTs 30 from the lower light-shielding films 11a.

Furthermore, a first interlayer insulating film 41 containing contact holes 81 that lead to the high concentration source regions 1d and contact holes 83 that lead to the high concentration drain regions 1e is formed on top of the scanning lines 3a.

The relay layers 71 and the capacitance lines 300 are formed on top of the first interlayer insulating film 41. A second interlayer insulating film 42 containing the contact holes 81 that lead to the high concentration source regions 1d and the contact holes 85 that lead to the relay layers 71 is formed on top of the relay layers 71 and the capacitance lines 300.

Furthermore, the data lines 6a are formed on top of the second interlayer insulating film 42. A third interlayer insulating film 43 containing the contact holes 85 that lead to the relay layers 71 is formed on top of the data lines 6a.

Figure 8:
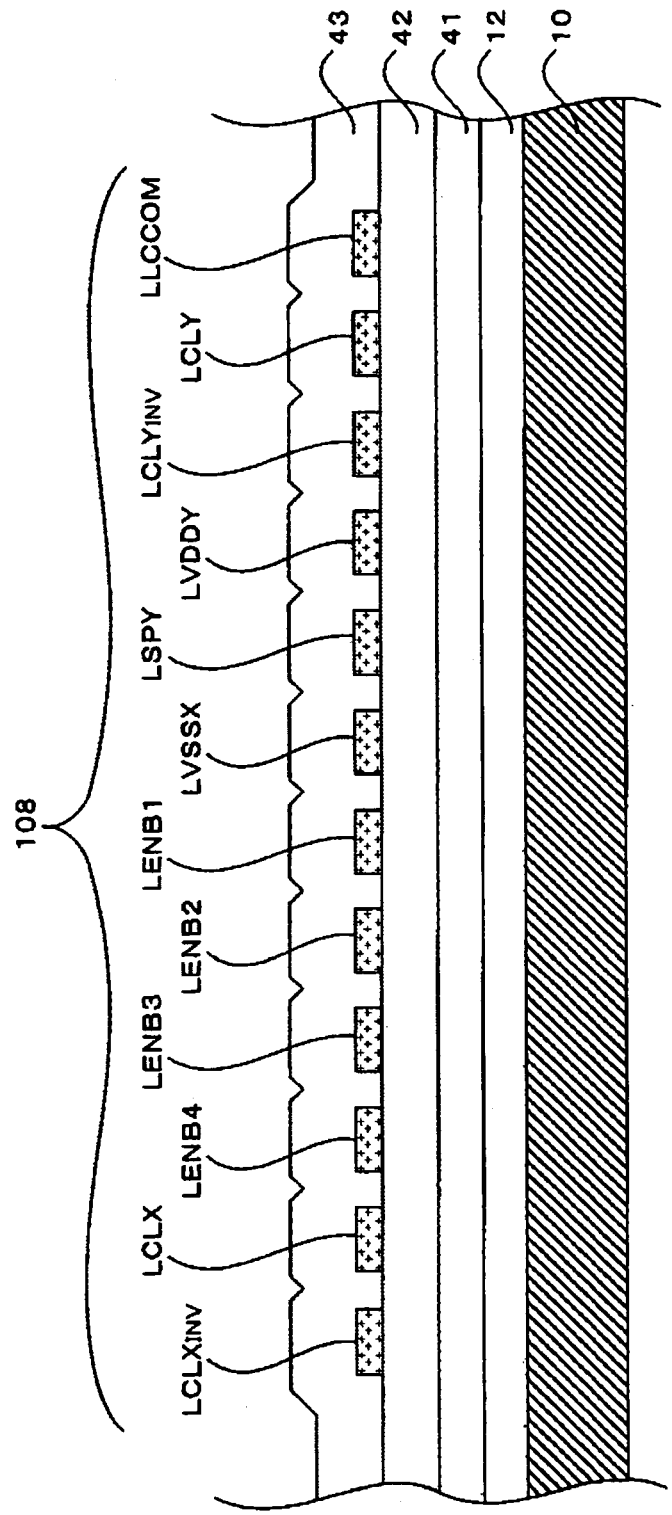
FIG. 8 is a sectional view taken along the line B–B' of FIG. 4 or 5.
Figure 9:
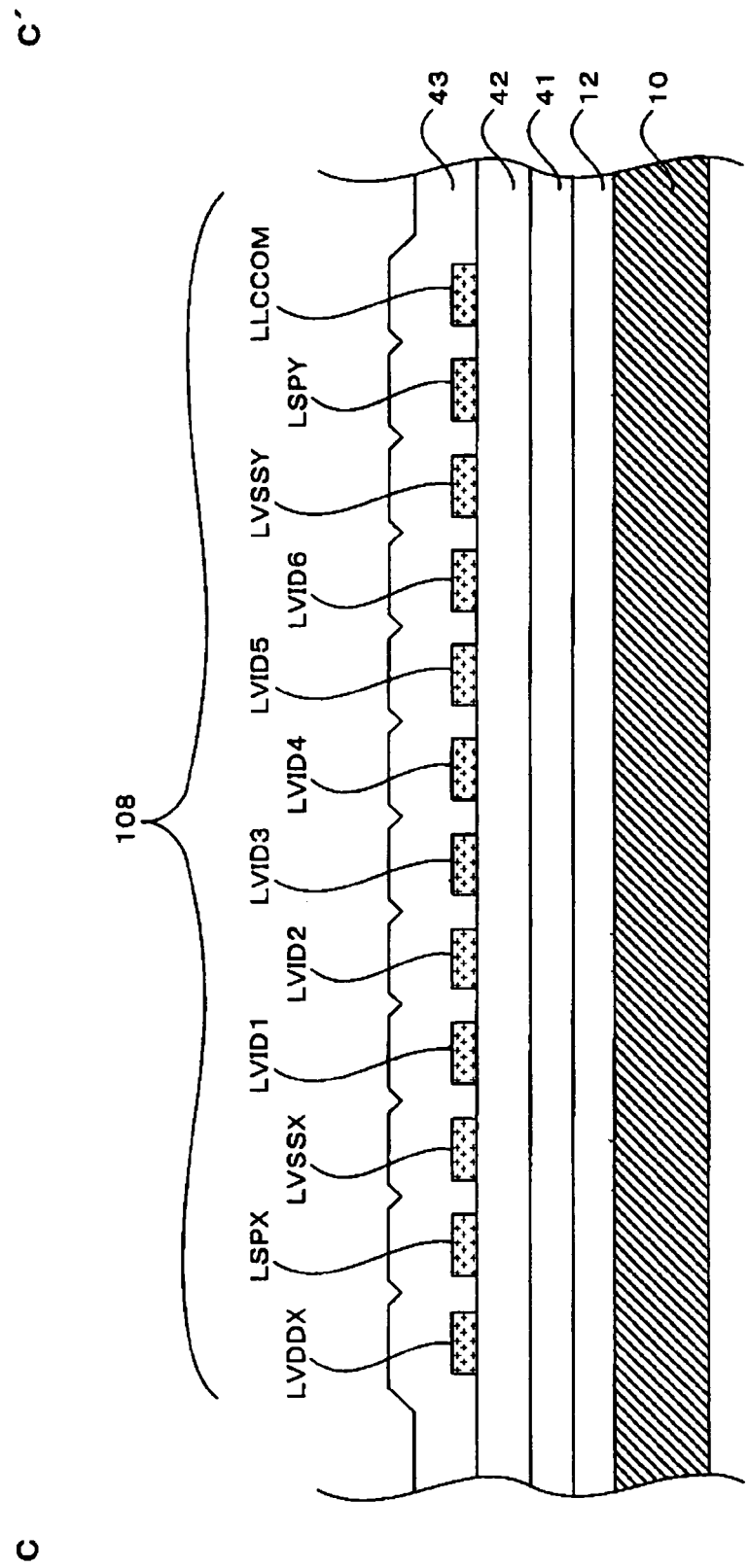
FIG. 9 is a sectional view taken along the line C–C' of FIG. 4 or 5.

Next, with reference to FIG. 7, corresponding to the sectional structures of the above-mentioned pixel portions, in particular, the sectional structures of the various signal wiring lines connected to the external circuit connection terminals according to the present embodiment will now be described. Here, FIG. 8 is a sectional view taken along the line B–B' of FIG. 4 or 5. FIG. 9 is a sectional view taken along the line C–C' of FIG. 4 or 5.

As illustrated in FIG. 8, all of the main wiring lines 108 connected to the terminals $TCLV_{INV}$ to TLCCOM corresponding to the right half of the view illustrated in FIG. 4 or 5 among the plurality of external circuit connection terminals 102 are simultaneously made of the same wiring line layer in the same manufacturing process on top of the second interlayer insulating film 42 illustrated in FIG. 7. Similarly, as illustrated in FIG. 9, the main wiring lines 108 connected to the terminals TVDDX to TLCCOM corresponding to the left half of the view illustrated in FIG. 4 or 5 among the plurality of external circuit connection terminals 102 are simultaneously made of the same wiring layer in the same manufacturing process on top of the second interlayer insulating film 42 illustrated in FIG. 7. That is, all of the main wiring lines 108 connected to the external circuit connection terminals 102 are made of the same wiring line layer formed at the same time as the wiring line layer of the data lines 6a formed on top of the second interlayer insulating film with reference to FIG. 7. The respective external circuit connection terminals 102 are arranged in the order illustrated in FIG. 4 or 5 so that the main wiring lines 108 connected to the external circuit connection terminals 102 are arranged without intersecting each other on the substrate.

As mentioned above, since the various main wiring lines 108 connected to the external circuit connection terminals 102 can be made of the same wiring line layer, it is possible to easily form the main wiring lines 108 in the manufacturing processes. Furthermore, since the main wiring lines 108 can be made of the same wiring line layer as the data lines 6a, it is possible to further simplify the manufacturing processes. Furthermore, since the data lines 6a are made of a metal film or an alloy film of low resistance, such as an aluminum film as mentioned above, the various main wiring lines 108 connected to the external circuit connection terminals 102 formed at the same time as the data lines 6a can also be made of the signal wiring lines of the low resistance. Therefore, it is possible to prevent signals from being delayed.

Figure 10:
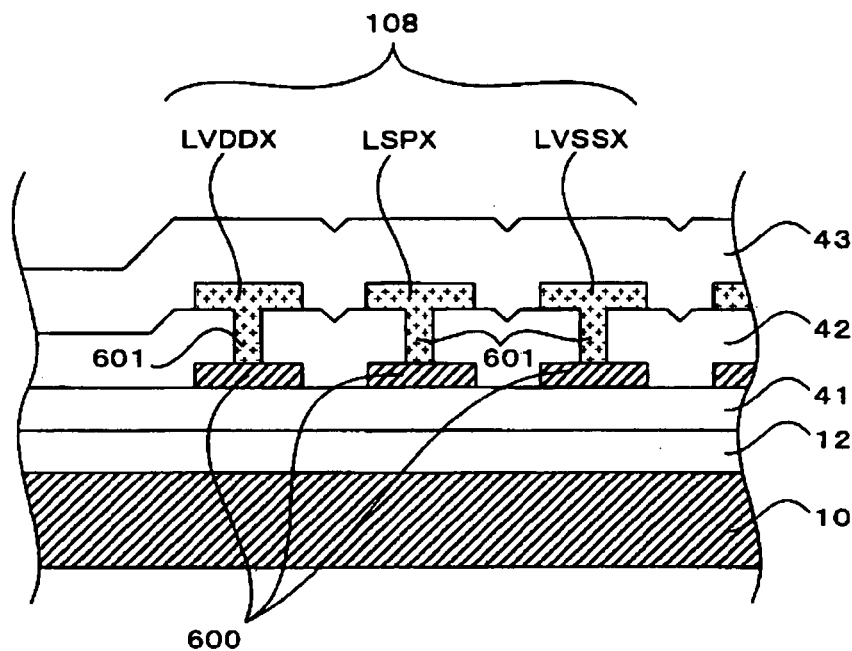
FIG. 10 is a sectional view of main wiring lines and redundant wiring lines according to a modified embodiment of the present invention.
Figure 11:
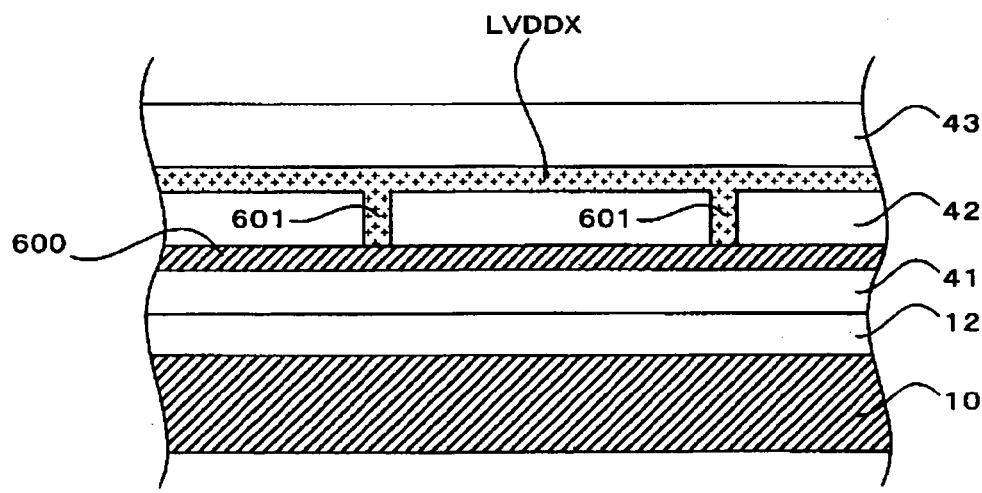
FIG. 11 is another sectional view of the main wiring lines and the redundant wiring lines according to the modified embodiment of the present invention.

An alternate configuration of the above-mentioned embodiment will be described with reference to FIGS. 10 and 11. Here, FIGS. 10 and 11 are sectional views of the main wiring lines and the redundant wiring lines according to the modification. FIG. 10 is a sectional view taken along the line C–C' of FIG. 4 or 5, like in FIG. 9 in the section orthogonal to the direction in which the main wiring lines and the redundant wiring lines extend. FIG. 11 is a sectional view taken along the section along the direction in which the main wiring lines and the redundant wiring lines extend.

As illustrated in FIGS. 10 and 11, according to the modified embodiment, like in FIG. 9, the wiring lines LVDDX, LSPX, and LVSSX that are the plurality of main wiring lines 108 made of the aluminum film have redundant wiring lines 600, respectively. The redundant wiring lines 600 are made of a layer different from that of the main wiring lines 108, for example, of the same conductive film as the capacitance lines 300 such as refractory metal. Also, the redundant wiring lines 600 extend in a state of overlapping the corresponding main wiring lines 108 in plan view and have almost the same plane layout as that of the main wiring lines 108 in the regions that have the redundant structure. Furthermore, the redundant wiring lines 600 are electrically connected to the corresponding main wiring lines 108 through a plurality of contact holes 601 and function as the redundant wiring lines of the connected main wiring lines 108. The other structures are the same as the embodiments described with reference to FIGS. 1 to 9.

Therefore, according to the present modified embodiment, it is possible to reduce the resistance of the main wiring lines 108 by adopting the redundant structures. Furthermore, even if one of the main wiring lines 108 or one of the redundant wiring lines that form the redundant structures is shorted, the redundant structures may continue to function as wiring lines. Therefore, it is possible to reduce the number of possible failure modes and to thus improve manufacturing yield.

Next, an embodiment of a projection color display device that is an example of an electronic apparatus in which the above-mentioned electro-optical device is used as a light valve will now be described with respect to the entire structure, in particular, the optical structure thereof. Here, FIG. 12 is a schematic sectional of a projection color display device.

Figure 12:
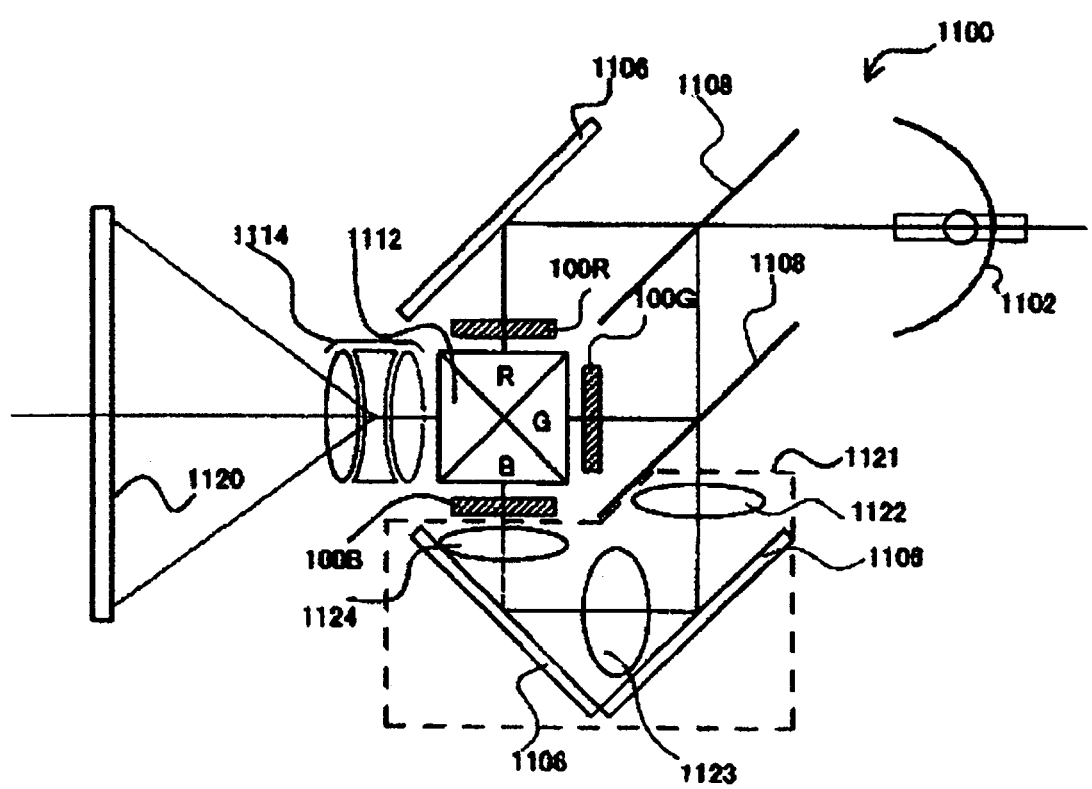
FIG. 12 is a schematic sectional view illustrating a color liquid crystal projector according to an example of a projection color display device according to an embodiment of an electronic apparatus according to the present invention.

In FIG. 12, a liquid crystal projector 1100 that is an example of a projection color display device according to the present embodiment includes three liquid crystal modules each including a liquid crystal device in which driving circuits are mounted on a TFT array substrate. The three liquid crystal modules are used as light valves 100R, 100G, and 100B for RGB. In the liquid crystal projector 1100, when projection light is emitted from a lamp unit 1102 that is a white light source such as a metal halide lamp, the projection light is divided into light components R, G, and B corresponding to the three primitive colors of RGB by three pieces of mirror 1106 and two pieces of dichroic mirror 11108 so that the divided light components are incident to the light valves 100R, 100G, and 100B corresponding to the respective colors. At this time, in particular, the light B is received through a relay lens system 1121 composed of an incidence lens 1122, a relay lens 11223, and an emission lens 1124 in order to prevent light loss due to a long light path. The light components corresponding to the three primitive colors modulated by the light valves 100R, 100G, and 100B are resynthesized by the dichroic prism 1112 and are projected to a screen 1120 through the projection lens 1114 as color images.

It should be understood that the present invention is not restricted to the above-mentioned embodiments and various changes in form and details may be made without departing from the spirit and scope of the invention as defined by the appended claims and the entire specification. The electro-optical device and the electronic apparatus in accordance with such modifications are included in the technical scope of the present invention.

What is claimed is:

1. An electro-optical device, comprising:
a plurality of pixel portions provided in an image display region on an element substrate;
in a peripheral region of the image display region on the element substrate, a plurality of external circuit connection terminals, a plurality of main wiring lines each having one end coupled to each of the plurality of external circuit connection terminals, and peripheral driving circuits coupled to the other ends of the main wiring lines, the peripheral driving circuits driving the pixel portions based on electric signals supplied from the external circuit connection terminals through the main wiring lines,
a counter electrode provided in the peripheral region on a counter substrate that is arranged to face the element substrate;
a counter electrode potential line that supplies counter electrode potential to the counter electrode, which is at least one of the plurality of main wiring lines,
upper and lower conduction terminals that are provided in the peripheral region on the element substrate, and that are connected to the counter electrode potential line,
the plurality of main wiring lines being made of a same conductive film and being planarly laid out so as not to intersect each other in the peripheral region; and
the counter electrode potential line being closest to edges of the element substrate, among the plurality of main wiring lines.

2. The electro-optical device according to claim 1, sub-wiring lines including at least one of internal wiring lines of the peripheral driving circuits, extending wiring lines extended from the peripheral driving circuits toward the pixel portions, and branch wiring lines branched from the main wiring lines, and first portions of the sub-wiring lines being made of a conductive film different from the same conductive film and being planarly laid out so as to intersect the main wiring lines with an interlayer insulating film therebetween in the peripheral region, and second portions thereof being formed of a same conductive film and are planarly laid out so as not to intersect the main wiring lines in the peripheral region.

3. The electro-optical device according to claim 2, the first portion and the second portion being electrically coupled to each other through contact holes formed in the interlayer insulating film.

4. The electro-optical device according to claim 1, the peripheral driving circuits being positioned nearer a center of the element substrate than the upper and lower conduction terminals and the counter electrode potential line in the peripheral region.

5. The electro-optical device according to claim 4, the plurality of external circuit connection terminals being arranged along one side of the element substrate, and the external circuit connection terminal of the plurality of the external circuit connection terminals, which is coupled to one end of the counter electrode potential line, being positioned near the end of an array of the plurality of external circuit connection terminals.

6. The electro-optical device according to claim 4, the plurality of main wiring lines including a pair of clock signal lines that supply a clock signal and an inverse signal thereof as electric signals, respectively, and that do not intersect the counter electrode potential line.

7. The electro-optical device according to claim 1, further comprising:
a part of the peripheral driving circuits being partially positioned nearer the center of the element substrate than the upper and lower conduction terminals and the counter electrode potential line in the peripheral region, and the other parts of the peripheral driving circuits being partially positioned nearer the edges of the element substrate than the upper and lower conduction terminals and the counter electrode potential lines in the peripheral region.

8. The electro-optical device according to claim 7, the plurality of external circuit connection terminals being arranged along one side of the element substrate, and the external circuit connection terminal of the plurality of external circuit connection terminals, which is connected to the other end or one end of plurality of main wiring lines, being positioned near the end of an array of the plurality of external circuit connection terminals.

9. The electro-optical device according to claim 7,
the plurality of main wiring lines including a pair of clock signal lines that supply a clock signal and an inverse signal thereof as electric signals, respectively, and that do not intersect the counter electrode potential line.

10. The electro-optical device according to claim 1,
the plurality of main wiring lines including a pair of clock signal lines that supply a clock signal and an inverse signal thereof as electric signals and power source wiring lines that supply power source signals as electric signals, and
the pair of signal lines and power source wiring lines do not intersect each other.

11. The electro-optical device according to claim 1,
the plurality of main wiring lines being planarly laid out so that the main wiring lines travel in zigzags so as not to intersect each other.

12. The electro-optical device according to claim 1,
the plurality of main wiring lines including at least partially redundant wiring lines composed of a different conductive film formed in a layer different from a same conductive film.

13. An electronic apparatus, comprising the electro-optical device according to claim 1.

* * * * *